United States Patent [19]
Randolph, Jr.

[11] 3,832,898
[45] Sept. 3, 1974

[54] DUAL-MOUNT ELECTROMECHANICAL DEFLECTION SENSOR

[76] Inventor: George J. J. Randolph, Jr., 1505 177th Ave., N.E., Bellevue, Wash. 98008

[22] Filed: Sept. 24, 1973

[21] Appl. No.: 400,184

[52] U.S. Cl. .............................. 73/141 A, 338/5
[51] Int. Cl. .......... G01l 1/04, G01l 1/18, G01b 7/18
[58] Field of Search........... 73/141 A, 825 R; 338/5, 338/6; 33/147 D, 148 D

[56] References Cited
UNITED STATES PATENTS

| 2,544,738 | 3/1951 | Tint | 73/88.5 R X |
| 3,327,270 | 6/1967 | Garrison | 73/88.5 R X |
| 3,742,418 | 6/1973 | Randolph, Jr. | 338/5 |

Primary Examiner—James J. Gill
Attorney, Agent, or Firm—Kolisch, Hartwell, Dickinson & Stuart

[57] ABSTRACT

A dual-mount deflection sensor including an elongated carrier for supporting a pair of piezoresistive elements. The carrier is unitary, and includes a pair of end parts (for securing it to an external body) and an elongated slender stem joining such parts. The stem has one portion with an outer surface of revolution for receiving the piezoresistive elements, and another portion with a noncircular, flattened, elongated transverse cross section for providing a preferential bending plane in the carrier. A modified carrier contains transverse slots in the second-mentioned portion of the stem for minimizing the effect on the piezoresistive elements of axially carried forces in the carrier.

7 Claims, 4 Drawing Figures

PATENTED SEP 3 1974　　3,832,898

3,832,898

DUAL-MOUNT ELECTROMECHANICAL DEFLECTION SENSOR

BACKGROUND AND SUMMARY OF THE INVENTION

This invention pertains to a novel carrier member, or carrier, usable in an electromechanical deflection sensor to support therein, and to telegraph deflections to, one or more electrical deflection-sensitive devices, such as piezoresistive elements. A preferred embodiment, and a modification, of the invention are described herein in conjunction with an extensometer, wherein they have been found to have particular utility.

In various applications, it is desirable to use an electromechanical deflection sensor which is capable of responding, as nearly as possible, solely to bending or deflection of the sensor in but a single plane. Often, for example, a sensor capable of this kind of performance is wanted for incorporation in what is known as an extensometer—a device used to monitor, for example, dimensional changes in a selected structure.

A general object of the present invention is to provide a novel sensor construction, and more particularly, a novel carrier construction for supporting an electrical deflection-sensitive device therein, which is capable of providing such performance in a practical and satisfactory manner.

According to a preferred embodiment of the invention, a unitary dual-mount carrier structure is proposed—this structure including a pair of end parts for securing the carrier in place to experience bending, and an elongated slender stem, or central part, joining the end parts. The stem contemplated has one elongated portion with an outer surface of revolution on which may be mounted one or more deflection-sensitive devices, such as piezoresistive elements. This first-mentioned portion joins integrally with another elongated portion—the latter having a noncircular, flattened, elongated transverse cross section which provides a preferential single bending plane in the carrier. In one form of the invention, the cross section just described for the latter-mentioned portion of the stem is substantially uniform throughout the length of such portion. In a modified form of the invention, this cross-sectional configuration is somewhat interrupted in a medial section of the stem portion by a pair of longitudinally spaced transversely overlapping slots which extend into opposite sides of the portion. These slots produce, in such medial section, a longitudinal spring rate which is lower than that possessed by the other sections of the second-mentioned stem portion.

With such construction, the carrier of the invention exhibits a preferential bending plane, which plane is normal to that plane containing both the longitudinal axis of the carrier and the longitudinal axis of the elongated cross section of the stem portion mentioned above. As will become apparent, this construction functions, in a fully assembled sensor, to focus selected, essentially uniplanar deflections into piezoresistive elements employed in the sensor.

As will also become apparent, the two different carrier modifications outlined above offer different overall longitudinal spring rates, which option makes the carrier readily usable in different applications where widely differing axial forces might be expected to be transmitted into the carrier. It is desirable, while maintaining the carrier as stiff as possible so as adequately to transmit bending deflections into piezoresistive elements which it carries, to have the carrier isolate these elements from the effects of axial forces in the carrier. Such axial forces can produce errors.

These and other objects and advantages which are attained by the invention will become more fully apparent as the description which follows is read in conjunction with the accompanying drawings.

DETAILED DESCRIPTION OF THE INVENTION

Figure 1:
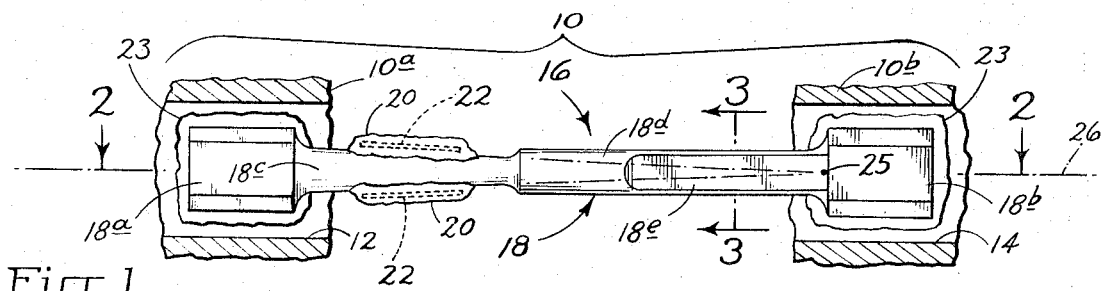
FIG. 1 is a simplified fragmentary side view showing portions of an extensometer which incorporates a deflection sensor including a carrier constructed according to the present invention.
Figure 2:
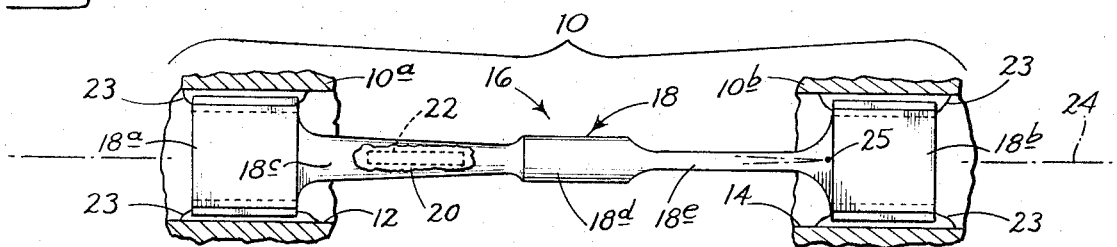
FIGS. 2 and 3 are views taken generally along the lines 2—2, 3—3, respectively, in FIG. 1.
Figure 3:
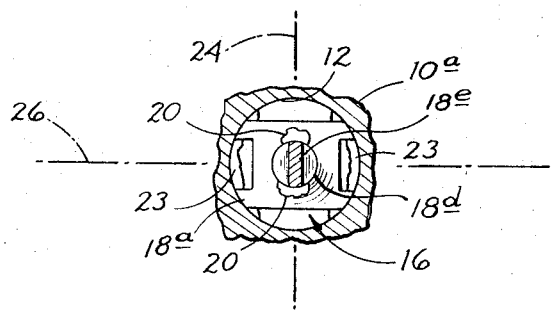

Turning now to the drawings and referring first to FIGS. 1-3, inclusive, indicated generally by the bracket at 10 are portions of an elongated unitary extensometer, the exact configuration of which is not critical to the present invention. Suffice it to say that extensometer 10 is positioned in FIGS. 1-3 (with its longitudinal axis upright) to respond to displacements which occur along a vertical plane in the figures. When mounted to experience such displacements, appropriate upper and lower parts of the extensometer, not shown in the figures, are attached to selected vertically spaced points on the body or structure wherein it is desired to monitor displacements. For the sake of maintaining simplicity in the drawings, only two fragmentary portions, 10a, 10b, are shown in the extensometer. On the extensometer sensing a vertical displacement, portions 10a, 10b move vertically relative to one another in FIGS. 1 and 2.

Provided in extensometer portion 10a, 10b are bores 12, 14, respectively. These bores have substantially the same diameter, and with the extensometer under no compression or tension, are axially aligned with one another. Such condition is illustrated in FIGS. 1-3. Bores 12, 14 comprise a means in the extensometer accommodating the mounting of a deflection sensor, such as sensor 16 which is constructed in accordance with the present invention.

Sensor 16 includes an elongated carrier member, or carrier, 18 on which are mounted through ceramic bonding deposits 20 a pair of elongated piezoresistive elements, or deflection-sensitive devices, 22. Carrier 18 is a unitary member, including end parts 18a, 18b which are joined through a central part, or stem, including portions 18c, 18d, 18e. The carrier is preferably formed of a stainless steel, such as stainless steels Nos. 416, 440C, and 6 (type 430).

The end parts of the carrier have the somewhat H-shaped cross-sectional configuration shown in FIG. 3 for end part 18a. As will also be apparent from FIG. 3, the end parts are shaped to fit fairly snugly within bores 12, 14, and to contact the walls of the bores at certain locations. The end parts, of course, accommodate mounting of sensor 16 in place, and are secured herein within bores 12, 14 through deposits 23 of a suitable adhesive, such as Minnesota Mining & Manufacturing Co.'s No. 2214 Adhesive.

Carrier portion 18c is the portion therein which mounts the piezoresistive elements. The left end of this portion in FIGS. 1 and 2 joins with end part 18a, and the right end of the portion joins with the left end of carrier portion 18d. Portion 18c has, along its length, a circular cross section, and is uniformly tapered from one diameter at its left end to a smaller diameter at its right end in these figures. In particular, portion 18c tapers toward a point 25 located on the axis of the carrier at the region where carrier portions 18b, 18e join. Carrier portion 18d has a cylindrical configuration, with its right end in FIGS. 1 and 2 joining with the left end of carrier portion 18e. The latter-mentioned carrier portion has a flattened, elongated transverse cross section whose longitudinal axis extends generally in the plane of FIG. 1—shown as plane 24 in FIGS. 2 and 3. Plane 24 contains the longitudinal axis of the carrier. The right end of carrier portion 18e in FIGS. 1 and 2 joins with end part 18b.

The piezoresistive elements are disposed with their longitudinal axes contained in plane 24. Suitable electrical connections (not shown) are made with the opposite ends of the elements to enable their coupling to conventional external circuitry wherein their responses may be followed.

With the carrier construction just described, carrier portions 18c, 18d, having circular transverse cross sections, exhibit along their lengths substantially directionally nonpreferential spring rates. In other words, regardless of the radial direction in which a bending or deflecting force is applied to these portions, for a given amount of force in a given radial plane these portions deflect as a unit by the same amount. In contrast to this situation, carrier portion 18e exhibits a preferential spring rate in a plane 26 (see FIGS. 1 and 3) which is normal to plane 24. This is because of the flattened, elongated cross section described earlier in portion 18e. Plane 26, therefore, constitutes what might be thought of as a preferential bending plane for the carrier. In other words, it is easier for carrier 18 to bend in plane 26 than in any other plane containing its longitudinal axis. The carrier exhibits its highest resistance to bending in plane 24.

This situation results in sensor 16, mounted as shown on extensometer 10, being extremely selective with respect to deflections which are capable of producing responses in piezoresistive elements 22. More specifically, the sensor tends to be most sensitive with respect only to relative vertical movement between end parts 18a, 18b in plane 24—which movement, of course, relates directly to those monitored displacements that produce axial tension and compression in the extensometer.

Figure 4:
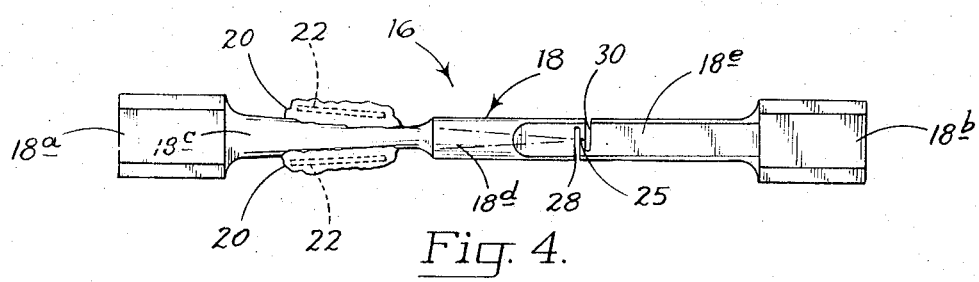
FIG. 4 is a side view of a sensor including a modified form of carrier according to the invention.

In applications where relatively large amounts of relative movement are expected between the end parts of the carrier, when such is mounted in an extensometer as shown in FIGS. 1-3, it is sometimes desirable to use the modified carrier 18 shown in FIG. 4. Here, the carrier shown differs from that illustrated in FIGS. 1-3 only respecting the design of carrier portion 18e. Modified carrier portion 18e includes, in a medial section thereof, a pair of longitudinally spaced, transversely overlapping slots 28, 30 which extend in from opposite sides of the portion. Further, in the modified carrier, point 25 is located in portion 18e between slots 28, 30.

Notches 28, 30 reduce the overall longitudinal spring rate of the carrier over that which, all other things being equal, it exhibits in the form shown in FIGS. 1-3. Such a construction is desirable where a relatively large amount of bending is expected in the carrier, for the reason that such bending produces significant relative movement of end parts 18a, 18b toward and away from one another. Such movement, absent notches like notches 28, 30, could have several undesirable results. First, it could produce significant axial loading of the carrier, which loading could significantly affect the responses produced in the piezoresistive elements. In other words, the elements would not be responding essentially solely to bending in the carrier. Further, such relative movement between end parts 18a, 18b could produce nonelastic stressing in the adhesive used to bond these end parts in place. This, of course, is undesirable.

In other respects, the modified carrier shown in FIG. 4 performs in essentially the same manner as, and has the same advantages of, the carrier shown in FIGS. 1-3.

In both modifications, the carrier provides the sensor with a highly selective bending sensitivity. This enables the sensor to respond, essentially, just to that information desired to be examined, while rejecting extraneous information. For example, in an extensometer such as extensometer 10, and with sensor 16 positioned as shown, the piezoresistive elements respond, for all practical purposes, solely to longitudinal compressive and tensive forces carried in the extensometer. Twisting of the extensometer about its longitudinal axis has no appreciable effect on the elements.

Tapering of carrier portions 18c as described in the two modifications results in whatever bending of the carriers that occurs in plane 24 producing uniform stressing along the lengths of the portions. This is desirable in obtaining maximum accuracy in the responses of the piezoresistive elements.

While modifications of the invention have been described herein, it is appreciated that other variations and modifications may be made without departing from the spirit of the invention.

It is claimed and desired to secure by letters patent:

1. In a dual-mount electromechanical deflection sensor, an elongated deflectable carrier for supporting an elongated electrical deflection-sensitive element, said carrier comprising
   a pair of spaced-apart end parts adapted for attaching the carrier to an external body, and
   an elongated central part extending between and joining said end parts,
   said central part including one elongated portion adapted to receive and mount such an element with the latter disposed with its longitudinal axis extending in a plane containing the longitudinal axis of the carrier, said one portion having along its length a transverse cross-sectional configuration providing said one portion along its length with a substantially directionally nonpreferential transverse spring rate, and
   another elongated portion joining longitudinally axially with said one portion and having along its length a transverse cross-sectional configuration providing said other portion along its length with a directionally preferential transverse spring rate, the latter spring rate being relatively high respecting deflections of the carrier in said plane, and relatively low respecting deflections of the carrier normal to said plane.

2. The sensor of claim 1, wherein said one portion has along its length a circular transverse cross section, and said other portion has along its length an elongated, noncircular transverse cross section, the latter cross section having its longitudinal axis extending in said plane.

3. The sensor of claim 2, wherein said end parts and said central part are unitary.

4. In a dual-mount electromechanical deflection sensor including an elongated deflectable carrier for supporting an elongated electrical deflection-sensitive element, said carrier comprising
a pair of spaced-apart end parts adapted for attaching the carrier to an external body, and
an elongated central part extending between and joining said end parts,
said central part including one elongated portion adapted to receive and mount such an element with the latter disposed with its longitudinal axis extending in a plane containing the longitudinal axis of the carrier, said one portion having along its length a transverse cross-sectional configuration providing said one portion along its length with a substantially directionally nonpreferential transverse spring rate, and
another elongated portion joining longitudinally axially with said one portion and having along its length a transverse cross-sectional configuration providing said other portion along its length with a directionally preferential transverse spring rate, the latter spring rate being relatively high respecting deflections of the carrier in said plane, and relatively low respecting deflections of the carrier normal to said plane,
said other portion being constructed with a medial section having a lower longitudinal spring rate than all other sections in said other portion.

5. The sensor of claim 4, wherein said one portion has along its length a circular transverse cross section, and said other portion, except throughout its said medial section, has along its length an elongated, noncircular cross section, the latter cross section having its longitudinal axis extending in said plane.

6. The sensor of claim 5, wherein said end parts and said central part are unitary.

7. The sensor of claim 6, wherein said medial section of said other portion is defined by at least a pair of longitudinally spaced, transversely overlapping slots extending into opposite sides of said other portion.

* * * * *